(No Model.)
D. FERGESEN.
ELEVATING TRUCK.
No. 561,161. Patented June 2, 1896.
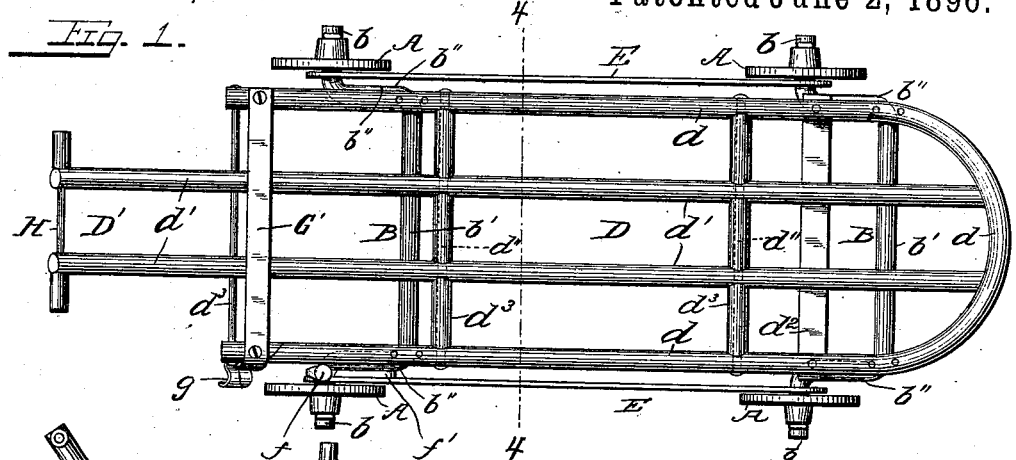
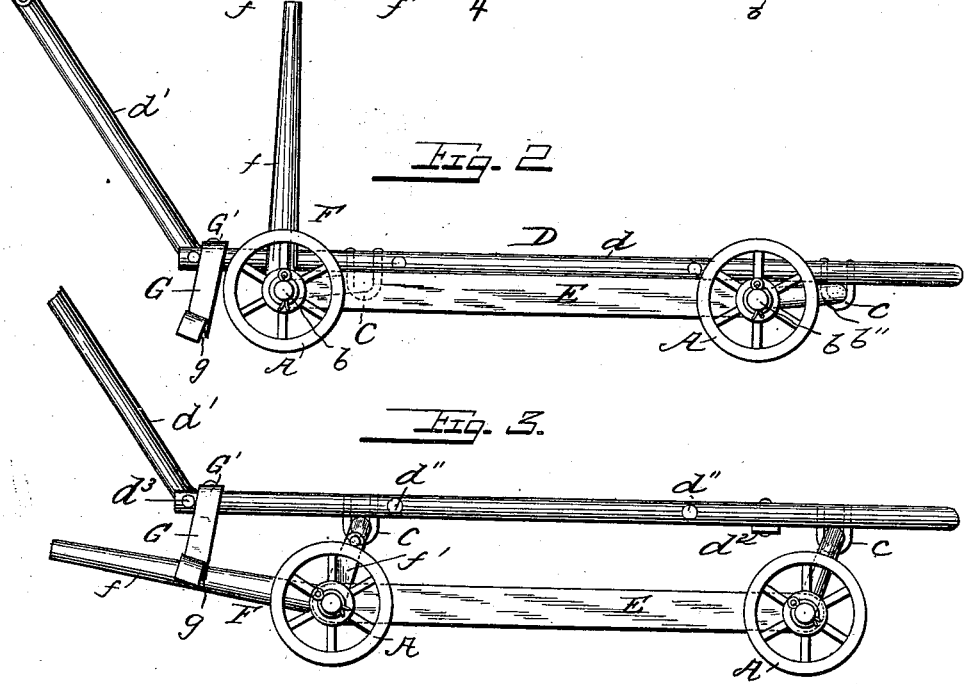
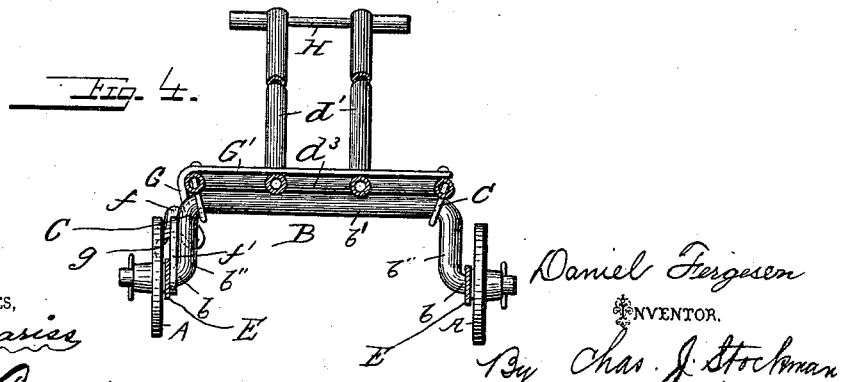
WITNESSES,
Daniel Fergesen
INVENTOR.
By Chas. J. Stockman
ATT'Y.

UNITED STATES PATENT OFFICE.

DANIEL FERGESEN, OF ROCKFORD, ILLINOIS.

ELEVATING-TRUCK.

SPECIFICATION forming part of Letters Patent No. 561,161, dated June 2, 1896.

Application filed October 21, 1893. Serial No. 488,763. (No model.)

*To all whom it may concern:*

Be it known that I, DANIEL FERGESEN, a citizen of the United States, residing at Rockford, in the county of Winnebago and State of Illinois, have invented certain new and useful Improvements in Transporting and Elevating Trucks; and I do hereby declare the following to be a full, clear, and exact description of the invention, such as will enable others skilled in the art to which it appertains to make and use the same.

This invention has relation to that class of hand-trucks in which the platform is movable bodily in a vertical plane, so as to elevate the article or articles supported thereon; and it consists in certain peculiarities in the construction, arrangement, and combination of the several parts, substantially as hereinafter described, and particularly pointed out in the subjoined claims.

The object of my invention is to provide a truck of the class stated which will be extremely simple and light in construction and at the same time cheap, strong, and durable. This object is accomplished by the construction illustrated in the accompanying drawings, in which—

Figure 1 is plan view of a hand-truck constructed in accordance with my invention. Fig. 2 is a side elevation of the same with the platform thereof in its lowermost position. Fig. 3 is a similar view with the platform elevated. Fig. 4 is a transverse section taken on the line 4 4 of Fig. 1.

The same letters of reference are used to designate the same parts in the several figures.

A designates the wheels of my improved truck, said wheels being rotatably mounted on outwardly-projecting ends $b$ of crank-axles B, the main portions $b'$ of which axles are loosely journaled in stirrups C or other suitable means projecting from the platform D. Said main portions $b'$ and the end portions $b$ of the respective axles are connected by the intermediate portions $b''$ thereof, as shown.

A designates rods which are preferably located one at each side of the truck and extend longitudinally from one axle to the other, thus connecting said axles together; but one instead of two rods may be employed to good purpose, if desired.

F designates a bell-crank lever which is fulcrumed at the junction of its members $f$ and $f'$, preferably upon the outwardly-projecting end $b$ of the rear axle B, and has the end of its shorter member $f'$ rigidly secured to the intermediate portion $b''$ of said axle.

From the above the operation of my invention will readily be understood to be as follows: Assuming that the platform is in its lowermost position and it is desired to elevate it, the operator catches hold of the free end of the lever F and depresses it, thus raising the opposite end $f'$ of said lever, and as said end $f'$ is secured to the portion $b''$ of the axle the latter will be caused to turn upward in the arc of a circle, upon its ends $b$ as its journals, until said portions $b''$ have assumed a vertical or nearly vertical position. As the axles are connected by the rods E the one unprovided with the lever will be caused, through the medium of said rods, to move simultaneously with the other axle, the platform being thus raised bodily and equally at both of its ends. To keep the platform in elevated position, I have provided the truck with a catch G, with which the member $f$ of the lever is engaged when the platform has been raised to the desired point. To lower the platform, it is only necessary to disengage the lever from the catch and raise the free end of the former, which causes the opposite end to move in the opposite direction and pull with it the axles of the truck.

The sides and one end of the platform D are made of tubes $d$, preferably gas-pipe. Extending from the forward end of the platform rearward to the rear end thereof and thence incliningly upward and rearward are tubes $d'$ $d'$, the horizontal portion of each of which forms a part of the platform and the inclined portion of each of which forms a part of the handle D' of the truck. Transverse rods $d''$ extend through the tubes $d$ and $d'$, and across the spaces between the same and encircling the portions of the rods within said spaces are tubular sections $d'''$. These rods serve to strengthen the platform and also as supports for the tubular sections $d'''$, and their ends are upset or otherwise suitably formed to secure them in place. At the rear end of the platform is a strap G', which extends transversely of the platform and has one of its ends bent downward and curved to form the stop G, above referred to.

The platform is completed by the strap $d^2$, located near the forward end thereof, and by the rod $d^3$, similar to the rods $d''$, at the rear end thereof, said rod $d^3$ being bent downward in its center to permit the tubes $d'$ to pass above them.

The upper ends of the inclined portions of the tubes $d'$ are connected by a transverse rod H, which forms the handle proper of the device, said rod preferably having tubular sections $h$ at either end to form a convenient means to be grasped by the hands of the operator.

Importance is attached to the herein-described construction of the platform, as it possesses extreme strength and durability, can be cheaply made, and yet is very light and cheap, all of which is of prime necessity in this class of trucks.

In order to permit the free end of the lever F to be engaged with the portion $g$ of the catch G and to clear the outer or free end of said catch while being moved up and down, said lever is loosely fulcrumed on the axle of the truck, so as to permit it to have the necessary lateral movement thereon.

Although I have shown and described the ends $b$ of the axles as extending outward, it is obvious that they may be extended inward in a direction parallel, or nearly so, with the main portions $b'$ thereof, and I therefore reserve to myself the liberty of so extending the said ends without departing from the spirit of my invention.

Other changes than those above referred to may be made in the details of the construction, and to vary the details I therefore wish to be understood as reserving to myself the privilege.

Having thus described my invention, what I believe to be new, and desire to secure by Letters Patent, is—

1. In a stove-truck, the combination of the platform, the stop projecting beyond the side thereof, the axles, having arched central portions, journaled upon the under side of the platform, and laterally-extending ends, the wheels journaled upon said ends, a bar connecting said axles, and a bell-crank lever, journaled at the junction of its two members upon an end of one axle and having the free end of its shorter member secured to the side of said axle.

2. In a stove-truck, the combination of the platform, the bent stop secured at one end to the platform and projecting beyond the side thereof, the handles extending rearward from the end of the platform, the axles having arched central parts, journaled upon the under side of the platform, and laterally-extending ends, the wheels loosely journaled upon said ends, a bar connecting said axles, and a bell-crank lever journaled at the junction of its two members upon an end of one axle and having the free end of one member secured to the side of said axle, said lever being movable laterally to engage it with said stop.

3. The combination, in an elevating and transporting truck, with the wheels and elevating mechanism thereof, of a platform, consisting of outer longitudinal and transverse tubes, inner longitudinal tubes, secured at their forward ends to the transverse tube and having their rear ends bent incliningly upward and rearward from the rear end of the platform, a rod, extending transversely through the extremities of said inclined portions of said inner tubes and serving as a handle, rods, extending across the platform, and transverse tubular sections encircling the parts of said rods in the spaces between said longitudinal tubes, substantially as described.

In testimony whereof I affix my signature in presence of two witnesses.

DANIEL FERGESEN.

Witnesses:
C. D. OBERHOLTZER,
NELLIE BUNKER.